United States Patent [19]
Kawasaki

[11] Patent Number: 4,676,128
[45] Date of Patent: Jun. 30, 1987

[54] COLUMNAR MATERIAL CUTTING MACHINE

[76] Inventor: Syousuke Kawasaki, 2400-15, Ohaza Kitatoyama, Komaki City, Aichi Prefecture, Japan

[21] Appl. No.: 881,063

[22] Filed: Jul. 2, 1986

[30] Foreign Application Priority Data

Jul. 2, 1985 [JP] Japan .................... 60-146249

[51] Int. Cl.⁴ .................... B23D 19/02; B23D 21/00
[52] U.S. Cl. .................... 82/58; 82/59; 82/70.2; 82/79; 83/199
[58] Field of Search .................... 82/58, 59, 60, 70.1, 82/70.2, 79, 80, 81, 88; 83/196, 199

[56] References Cited

U.S. PATENT DOCUMENTS

| | | | |
|---|---|---|---|
| 2,038,254 | 4/1936 | Worthington | 82/59 |
| 3,494,233 | 2/1970 | Kojima | 83/199 |
| 4,003,279 | 1/1977 | Carmichael | 82/58 |

FOREIGN PATENT DOCUMENTS

| | | | |
|---|---|---|---|
| 2405517 | 8/1974 | Fed. Rep. of Germany | 83/199 |
| 927417 | 5/1982 | U.S.S.R. | 83/199 |
| 996111 | 2/1983 | U.S.S.R. | 83/199 |
| 1061944 | 12/1983 | U.S.S.R. | 82/58 |

Primary Examiner—Nicholas P. Godici
Assistant Examiner—Jerry Kearns
Attorney, Agent, or Firm—Anthony J. Casella; Gerald E. Hespos

[57] ABSTRACT

This invention envolves a columnar material cutting machine which has a stationary cutter fastened into a base and having an inner opening substantially equal to the outer profile of a material to be cut, a movable cutter contacted at one end therewith with one end of the stationary cutter and having an inner opening substantially equal to the shape as the stationary cutter, and drive means for moving the movable cutter in a circular motion without rotating the movable cutter. Thus, the machine can cut a solid columnar metal or a metal pipe with a smooth cutting surface without cutting chips.

9 Claims, 4 Drawing Figures

COLUMNAR MATERIAL CUTTING MACHINE

BACKGROUND OF THE INVENTION

This invention relates to a machine for cutting a columnar metal rod or tube perpendicularly with respect to the center line of the rod or tube.

There has heretofore been a metal tube cutting machine in which a mandrel was inserted into the metal tube to hold the tube from the inner surface so as not to deform the metal tube and a shearing cutter was hydraulically moved perpendicularly to the metal tube to cut the tube or in which a disc-shaped cutter was rotated around a metal tube while rotating the cutter by using the outer peripheral edge of the cutter to cut the tube. These cutting machines do not produce cutting chips to cut the tube, but a burr is produced at the cutting surface, or an uneven state is formed on the cutting surface, and it is necessary to finish the cutting surface by polishing after cutting. There has also been a metal rod cutting machine in which an uneven state was produced on the cutting surface and a smooth cutting surface could not be obtained.

SUMMARY OF THE INVENTION

It is therefore an object of the present invention to provide a cutting machine capable of cutting a solid columnar metal or a metal pipe with a smooth cutting surface without cutting chips.

In order to achieve the above and other objects, there is provided a cutting machine which comprises a columnar stationary cutter having an inner opening including the same shape as a material to be cut, disposed on the same coaxial center, and an eccentrically movable cutter (hereinbelow referred to "an eccentrically movable cutter") having the same inner opening as that of the stationary cutter and the columnar material to be cut and inserted into the movable cutter to uniformly cut the entire periphery of the columnar material by eccentrically moving the movable cutter. Thus, the columnar material cutting machine comprises a columnar stationary cutter having an inner opening formed at part of a through hole of its base, a cylindrical eccentrically movable cutter disposed in the base so that the one end of the stationary cutter is contacted with one end thereof to bring the stationary cutter into coincidence with the center line of the inner opening, having an inner opening including the same shape as that of the stationary cutter and an outer profile formed in a circular shape, an inside bearing disposed on the outer periphery of the movable cutter, a cylindrical drive cylinder disposed on the outer periphery of the inside bearing so that the outside cylindrical surface eccentrically moves with respect to the inside cylindrical surface, rotated at the outside cylindrical surface by a drive unit to eccentrically move the inside cylindrical surface to rotate, and an outside bearing disposed between the base and the drive cylinder.

The cutting machine of this invention cuts a metal pipe or rod by enclosing the entirety by the stationary cutter and the eccentrically movable cutter to shear the pipe or rod by utilizing the inner surface thereof and eccentrically move the movable cutter without rotation with respect to the stationary cutter to uniformly cut the entire periphery in case of shearing. Thus, the cutting end of the rod or pipe is not deformed, but smooth cutting surface can be formed.

According to the cutting machine of the invention, a columnar pipe or solid rod can be smoothly cut without deformation nor uneven state on the cutting end, without cutting chips nor noise, and it is not necessary to finish the cutting end to be advantageous in a mass production.

The above and other objects, features and advantages of the present invention will become apparent from the following detailed description of a preferred embodiment when taken in conjunction with the accompanying drawings.

DESCRIPTION OF THE PREFERRED EMBODIMENTS

An embodiment of a cutting machine according to the present invention will be described in detail with reference to FIGS. 1 to 4.

Figure 1:
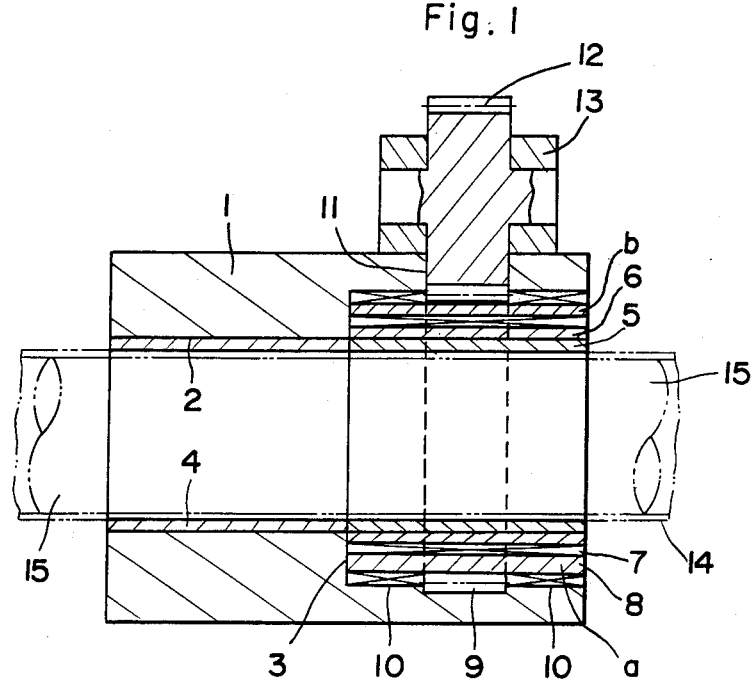
FIG. 1 is a front sectional view of an embodiment of a cutting machine according to the present invention.

Reference numeral 1 designates a base, the outer profile of which is columnar in FIG. 1, but may be of a square cross-section. A through opening 2 is formed in the base 1, is columnar, and is composed of a large-diameter portion and a small-diameter portion divided via a step 3 formed therebetween.

The step 3 is a plane surface perpendicular with respect to the center line of the base 1. A cylindrical stationary cutter 4 having a uniform thickness at the entire periphery is fastened detachably by a key to the base 1 at the inner surface of the small-diameter side of the opening 2 in such a manner that the one end thereof is aligned with the step 3. A cylindrical eccentrically movable cutter 5 having the same inner and outer diameters as those of the cutter 4 is contacted at one end thereof with one end of the cutter 4 in the large-diameter side of the opening 2, and the cutters 4 and 5 are so inserted into the opening 2 that the center lines of the cutters 4 and 5 coincide before cutting. An inside roller bearing 7 is disposed in a cylindrical shape on the outer periphery of the cutter 5. The cutter 5 is made of a cemented carbide. When the cutter 5 is contacted directly with the bearing 7, the bearing 7 is damaged. In order to prevent the bearing 7 from being damaged and to prevent the cutting chips from being introduced into the bearing 7, a protective cylinder 6 made of a plain steel normally used as a cylindrical bearing case having a uniform thickness at the entire periphery is disposed on the entire periphery of the cutter 5, and the cutter 5 is contacted with the bearing 7 through the cylinder 6. Since the inner and outer surfaces are formed in cylindrical shape so that the center lines of the inner and outer surfaces are eccentrically moved in parallel with each other on the outer periphery of the bearing 7, a drive cylinder 8 made of a plain steel to become maximum and minimum thickness portions a and b opposed at 180° at the peripheral walls is inserted thereinto. A gear 9 is formed at the lateral center of the outer periphery of the cylinder 8, and a cylindrical outside bearing 10 is inserted into between the outer periphery of the cylinder 8 at the right and left sides of the gear 9 and the large-diameter side inner surface of the opening 2 of the base 1. The bearing 10 may be a metal bearing or a roller bearing. The large-diameter side of the opening 2 of the base 1 is eccentrically displaced with respect to the small-diameter side from the step 3 in the amount eccentrically displaced at the inner and outer peripheral surfaces of the cylinder 8.

The stationary cutter 4 may be formed integrally with the base 1, but when the base 1 is formed of the cemented carbide, it becomes very expensive. Thus, only the cutter 4 is ordinarily formed of the cemented carbide, and the base 1 is formed of a plain steel, and the cutter 4 is fastened to the base 1. Since the cutters 4 and 5 are all contacted as used for cutting only at the portions contacted with the ends, the short contacting portions may be formed of the cemented carbide.

A notch 11 is formed at the position corresponding to the gear 9 on the outer periphery of the base 1, and a drive gear 12 is engaged in mesh with the gear 9 through the notch 11. Reference numeral 13 designates a bearing of the gear 12 mounted on the base 1. The gear 12 may be a rack. The base 1 is fastened to a trestle, and the gear 12 is provided to be rotated by a hydraulic motor.

A columnar material such as a metal pipe or rod to be cut is preferably formed in size of outer diameter to be closely contacted with the bores of the cutters 4 and 5. This is because, if a clearance between the metal pipe or rod and the cutters 4, 5 is large, the cut end of the metal pipe or rod is deformed at the cutting time.

When the metal pipe is cut, the center of the cutter 4 and the center of the inner periphery of the cutter 5 are brought into coincidence, the cutter 4 side is used preferably for the columnar material inserting side, and the cutter 5 side is used for the cut columnar material exhausting side.

More specifically, if used vice versa, when a long columnar material is cut, it is necessary to move the entire long columnar material in coincidence with the movement of the cutter 5, and a large complicated mechanism must be incorporated.

Since a pipe 14 inserted as shown in FIG. 1 over both sides of the cutters 4 and 5 might be deformed at the cutting surfaces merely with the pipe 14, the pipe 14 is supported by mandrels 15 inserted from both sides to collide at the step 3 therein. In this case, a clearance between the outer diameter of the mandrel 15 and the inner surface of the pipe 14 may be preferably as small as possible.

Figure 2:
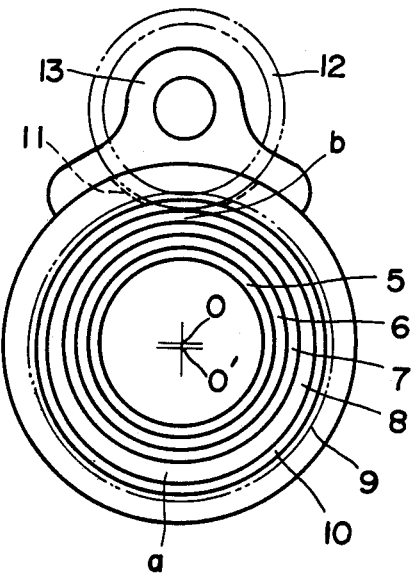
FIG. 2 is a side view of FIG. 1.

When the gear 9 is rotated by the gear 12 to rotate the cylinder 8, the cylinder 8 eccentrically moves at the centers O and O' of the inner and outer peripheral surfaces thereof as shown in FIG. 2 as described above so as to become maximum and minimum thickness portions a and b opposed at 180° at the peripheral wall, and the outer and inner peripheral surfaces of the cylinder 8 move differently.

The central point of the cutter 4 must be disposed at the center O, the columnar material is eccentrically displaced from the cutter 4 side at the position that the central point of the outer peripheral side of the cylinder 8 is disposed at the center O to be inserted into the cutter 5.

More particularly, the outer peripheral side of the cylinder 8 moves in a circular motion along the peripheral surface of the large-diameter portion on the inner surface of the base 1 through the outer bearing 10 with the central point O' as a coaxial center. (The coaxial center of the large-diameter portion of the base 1 is O'.)

Figure 3:
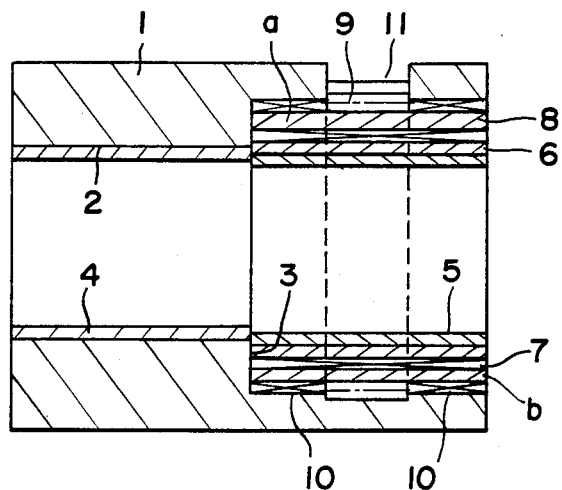
FIG. 3 is a view showing similar to FIG. 1 in the state that an eccentrically movable cutter is eccentrically moved with respect to a stationary cutter.
Figure 4:
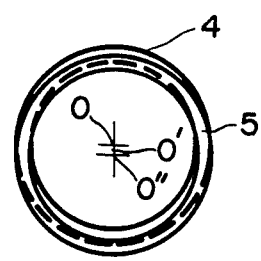
FIG. 4 is a side view showing the eccentric relationship between the stationary cutter and the movable cutter.

On the other hand, since the inner peripheral side of the cylinder 8 has a central point at the center O eccentrically displaced from the central point O', when the cylinder 8 rotates along the peripheral surface of the inside large-diameter portion of the base 1 through the bearing 10, the cylinder 8 eccentrically moves, and the central point O rotates 360° around the centeral point O' as the cylinder 8 rotates and returns to the original position. In other words, the central point (i.e., the central point of the cutter 5) of the inner peripheral side of the cylinder 8 draws a circular motion with the central point O' as a center, and the central point O of the cutter 4 is disposed at one point on the circumference of the circular motion. Therefore, when the columnar material to be cut is inserted, the central points O of the cutters 4 and 5 must coincide, but when the cylinder 8 is rotated at 180° as shown in FIG. 3, the central point of the cutter 5 slightly eccentrically moves to draw a circular motion, the initial central point O of the cutter 5 moves to O'' as shown in FIG. 4, rotates 180° at the maximum and minimum thickness portions a and b of the cylinder 8 as from from FIG. 1 to FIG. 3 to be replaced at the positions. Thus, the cutter 5 moves in a circular motion without rotation with respect to the cutter 4 as shown in FIG. 4 to shear one end of the material to be contacted with one another.

This shearing amount may be in length equal to or slightly larger than the thickness of the pipe to be cut in case of the pipe.

When the cutter 5 is eccentrically moved with respect to the cutter 4 at the inside of the cylinder 8 while rotating, the metal pipe to be cut is rotated to the cutter 5, thereby twisting to cut it, with the result that the smooth cutting cannot be performed.

More specifically, in the present invention, there is provided the cutter 5 (similar to the columnar material to be cut) which is not rotated but moved in parallel in opposite direction at 180° even if the bearing 7 is interposed between the cylinder 8 and the cutter 5 and the cylinder 8 is rotated.

In the embodiment described above, it is difficult to move the columnar material supply side (stationary side) in practice. Thus, the stationary and movable sides are separately described, but both may be relatively moved in the base 1. The pipe or rod to be cut is not limited to the columnar material, but may have elliptical cross-section, square cross-section or hexagonal cross-section columnar shape. The columnar material is cut by forming so that the shapes of the inner openings of the stationary cutter and the eccentrically movable cutter having the same outer profile shape as the columnar material to be cut.

When the long pipe is sequentially cut from one end, the mandrels inserted into the movable cutter may be formed of a cylinder to be telescoped into the movable cutter and to be movable according to the eccentric movement of the movable cutter. Then, the mandrel is inserted into the pipe and pneumatically inserted into the stationary cutter to be collided with the mandrel of the movable cutter side inserted by the cylinder so as to be aligned with one end of the movable cutter to cut the material. After cutting, the mandrel of the movable cutter side is removed outside from the movable cutter, the pipe is then pushed forward toward the movable cutter from the stationary cutter to drop the cut pipe, the mandrel of the movable cutter side is inserted into the pipe extended into the movable cutter to push to return the mandrel of the stationary cutter side into the stationary cutter, pneumatic pressure is again applied into the pipe to press-bond the mandrel of the stationary cutter side to the mandrel of the movable cutter side to cut the material.

When the thick material to be cut is cut, if the eccentrically moving amount of the movable cutter is increased, the material may be cut, but, in this case, if the cutting machine is excessively increased in size, the stationary cutter side may employ the eccentrically movable cutter in the same manner as the movable cutter.

What is claimed is:

1. A columnar material cutting machine comprising:
   a base;
   a stationary cutter fastened into said base and having a pair of opposed ends and an inner opening substantially equal to the outer profile of a columnar material to be cut, said inner opening extending between said opposed ends of said stationary cutter;
   a movable cutter having a pair of opposed ends and having an inner opening substantially equal to the shape of the inner opening of said stationary cutter, one end of said movable cutter being in contact with one end of said stationary cutter;
   an inside bearing disposed on the outer periphery of said movable cutter;
   a drive cylinder having substantially parallel but eccentric outside and inside cylindrical surfaces, said inside cylindrical surface of said drive cylinder being disposed about the outer periphery of said inside bearing such that the inside surface of the drive cylinder is rotatable about said movable cutter, said drive cylinder being mounted adjacent said base for rotation about the center of said outside cylindrical surface such that in one rotational position of said drive cylinder about the center of the outside cylindrical surface said stationary and movable cutters are aligned;
   drive means for rotatably moving said drive cylinder 360° about the center of the outside cylindrical surface of said drive cylinder, such that the rotation of said drive cylinder moves said movable cutter in a circular motion relative to said stationary cutter without rotating said movable cutter.

2. A columnar material cutting machine according to claim 1, wherein said drive means comprises an outside bearing disposed between said base and said drive cylinder.

3. A columnar material cutting machine according to claim 2, wherein said inside bearing is a roller bearing.

4. A columnar material cutting machine according to claim 2, wherein said outside bearing is a roller bearing or a metal bearing.

5. A columnar material cutting machine according to claim 1, wherein said drive means comprises a gear formed on the outer periphery of said drive cylinder, and a drive gear engaged in mesh with said gear.

6. A columnar material cutting machine according to claim 1, wherein a protective cylinder is further disposed on the outer periphery of said movable cutter.

7. A columnar material cutting machine according to claim 1, wherein said columnar material is a pipe, and wherein said cutting machine further comprises at least one mandrel inserted into said pipe.

8. A columnar material cutting machine according to claim 1, wherein the portions of said stationary and movable cutters to be contacted with one another are formed at least of a cemented carbide.

9. A columnar material cutting machine according to claim 1, wherein said columnar material is inserted from the movable cutter side.

* * * * *